United States Patent [19]
Nishino

[11] Patent Number: 6,116,510
[45] Date of Patent: Sep. 12, 2000

[54] CODE READING AND RECORDING APPARATUS

[75] Inventor: Hirokazu Nishino, Fuchu, Japan

[73] Assignee: Olympus Optical Co., Ltd., Tokyo, Japan

[21] Appl. No.: 09/074,283

[22] Filed: May 7, 1998

[30] Foreign Application Priority Data

May 16, 1997 [JP] Japan ................................. 9-127191

[51] Int. Cl.⁷ .................................................. G06K 19/06
[52] U.S. Cl. ........................................... 235/494; 235/456
[58] Field of Search ................................... 235/494, 454, 235/456, 462.01, 462.13, 462.15

[56] References Cited

U.S. PATENT DOCUMENTS

| | | | |
|---|---|---|---|
| 4,263,504 | 4/1981 | Thomas | 235/487 |
| 4,866,257 | 9/1989 | Elliott et al. | 235/436 |
| 5,192,949 | 3/1993 | Suzuki et al. | 341/68 |
| 5,541,396 | 7/1996 | Rentsch | 235/454 |
| 5,726,435 | 3/1998 | Hara et al. | 235/494 |

FOREIGN PATENT DOCUMENTS

| | | |
|---|---|---|
| 0 670 555 A1 | 9/1995 | European Pat. Off. . |
| 0 717 398 A2 | 6/1996 | European Pat. Off. . |
| 0767454 A1 | 4/1997 | European Pat. Off. . |
| 0773511 A1 | 5/1997 | European Pat. Off. . |

*Primary Examiner*—Donald Hajec
*Assistant Examiner*—Daniel St. Cyr
*Attorney, Agent, or Firm*—Frishauf, Holtz, Goodman, Langer & Chick, P.C.

[57] ABSTRACT

A code pattern image printed/recorded on a recording medium and adapted to be picked up and read is electronically taken up and read and then processed by a decoder to restore the original data, which is then transformed into an image data of the code pattern image by an encoder and printed/recorded on another predetermined recording medium to reproduce the code pattern image by a printer. The code pattern image printed/recorded on the recording medium is made to contain an operation control data for permitting or prohibiting the operation of the encoder and the operation control data is extracted from the code pattern image by an operation control data extracting unit so that encoding operation control section permits or prohibits the operation of the encoder according to the extracted data.

11 Claims, 12 Drawing Sheets

FIG. 9

| 2 | 4 | 6 | 8 | 10 | 12 | 14 | 16 |
|---|---|---|---|----|----|----|----|
| 1 | 3 | 5 | 7 | 9  | 11 | 13 | 15 |

| 1 | 4 | 6 | 8 | 9  | 12 | 14 | 16 |
|---|---|---|---|----|----|----|----|
| 2 | 3 | 5 | 7 | 10 | 11 | 13 | 15 |

FIG. 11

| 2 | 3 | 6 | 8 | 10 | 11 | 14 | 16 |
|---|---|---|---|----|----|----|----|
| 1 | 4 | 5 | 7 | 9  | 12 | 13 | 15 |

FIG. 12

| 2 | 4 | 5 | 8 | 10 | 12 | 13 | 16 |
|---|---|---|---|----|----|----|----|
| 1 | 3 | 6 | 7 | 9  | 11 | 14 | 15 |

FIG. 13

| 12 | 14 | 16 | 18 | 20 | 22 | 24 | 26 |
|----|----|----|----|----|----|----|----|
| 11 | 13 | 15 | 17 | 19 | 21 | 23 | 25 |

FIG. 14

| 3 | 5 | 7 | 9 | 11 | 13 | 15 | 17 |
|---|---|---|---|----|----|----|----|
| 2 | 4 | 6 | 8 | 10 | 12 | 14 | 16 |

FIG. 15

| 4 | 6 | 8 | 10 | 12 | 14 | 16 | 18 |
|---|---|---|---|----|----|----|----|
| 3 | 5 | 7 | 9  | 11 | 13 | 15 | 17 |

| DECIMAL | BINARY | DECIMAL | BINARY | DECIMAL | BINARY | DECIMAL | BINARY |
|---|---|---|---|---|---|---|---|
| 0 | 00000 | 8 | 01000 | 16 | 10000 | 24 | 11000 |
| 1 | 00001 | 9 | 01001 | 17 | 10001 | 25 | 11001 |
| 2 | 00010 | 10 | 01010 | 18 | 10010 | 26 | 11010 |
| 3 | 00011 | 11 | 01011 | 19 | 10011 | 27 | 11011 |
| 4 | 00100 | 12 | 01100 | 20 | 10100 | 28 | 11100 |
| 5 | 00101 | 13 | 01101 | 21 | 10101 | 29 | 11101 |
| 6 | 00110 | 14 | 01110 | 22 | 10110 | 30 | 11110 |
| 7 | 00111 | 15 | 01111 | 23 | 10111 | 31 | 11111 |

FIG. 21

| DECIMAL | (3-BIT) BINARY | (5-BIT) BINARY |
|---|---|---|
| 0 | 000 | 00000 |
| 1 | 001 | 00001 |
| 2 | 010 | 00010 |
| 3 | 011 | 00011 |
| 4 | 100 | 00100 |
| 5 | 101 | 00101 |
| 6 | 110 | 00110 |
| 7 | 111 | 00111 |

FIG. 22

| DECIMAL | (3-BIT) BINARY | (5-BIT) BINARY |
|---|---|---|
| 0 | 000 | 10000 |
| 1 | 001 | 10001 |
| 2 | 010 | 10010 |
| 3 | 011 | 10100 |
| 4 | 100 | 10101 |
| 5 | 101 | 10110 |
| 6 | 110 | 11000 |
| 7 | 111 | 11001 |

FIG. 23

| DECIMAL | (3-BIT) BINARY | (5-BIT) BINARY |
|---|---|---|
| 0 | 000 | 00000 |
| 1 | 001 | 10001 |
| 2 | 010 | 00010 |
| 3 | 011 | 00011 |
| 4 | 100 | 10100 |
| 5 | 101 | 00101 |
| 6 | 110 | 00110 |
| 7 | 111 | 01000 |

FIG. 24

MARKER DIAMETER

MARKER DIAMETER

CODE READING AND RECORDING APPARATUS

BACKGROUND OF THE INVENTION

This invention relates to a code reading and recording apparatus for reading a code pattern image recorded on a recording medium as an image that can be picked up and read electronically.

EP 0,670,555 A1 discloses a system for recording digitized data on a recording medium and reproducing the recorded data from the medium. With the disclosed information recording/reproducing system, data are recorded as an optically readable code pattern image on a recording medium such as a sheet of paper by printing. While this system provides a number of advantages including that the recorded data can be reproduced in a simple manner, it has its own drawbacks. For example, the recorded code pattern image can easily be copied to fraudulently use the information contained in the image and infringe the copyright on the information if the information constitutes an intellectual property unless some protective measures are taken.

Meanwhile, known techniques for preventing recorded information from being copied include adding a header to the information and making the header contain control data that permits or prohibits printing the information for copying. Such a technique may be applied to the above disclosed system to protect the recorded information against any fraudulent use.

However, a header or a footer for permitting or prohibiting copying can be added to the proper information only at the cost of reducing the storage area for storing information and hence, in many cases, partly eliminating the information to be stored. Therefore, the use of such a header or a footer is against a maximal exploitation of the data storage capacity of a system of the type under consideration.

BRIEF SUMMARY OF THE INVENTION

In view of the above identified problem of the prior art, it is therefore the object of the present invention to provide a code reading and recording apparatus that can effectively prevent any code pattern image from being fraudulently copied and protect the copyright of the information contained in the image, if the information constitutes an intellectual property, without reducing the quantity of information to be recorded by ingeniously utilizing the format of printing a code pattern image.

According to an aspect of the present invention. There is provided a code reading and recording apparatus comprising:

a reading section for picking up and reading a code pattern image printed/recorded on a recording medium as data adapted to be picked up and read and containing at least one of an audio data, a video data and a digital code data;

a decoder for decoding the code pattern image read by the reading section and retrieving the original data;

an encoder for transforming the data retrieved by the decoder into an image data of a code pattern image; and a recording section for printing/recording the transformed image data on a predetermined recording medium as code pattern image adapted to be picked up and read, wherein the code pattern image contains an operation data for permitting or prohibiting the operation of the encoder, and the code reading and recording apparatus further comprises:

an operation control data extracting section for extracting the operation data from the code pattern image read by the reading section; and an operation control section for permitting or prohibiting the operation of the encoder according to the operation data extracted by the operation control data extracting section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 9 is a schematic illustration of a block arrangement of code for permitting free copying that can be used for the first embodiment;

FIG. 10 is a schematic illustration of a block arrangement of code for prohibiting copying that can be used for the first embodiment;

FIG. 11 is a schematic illustration of a block arrangement of code for permitting copying only once that can be used for the first embodiment;

FIG. 12 is a schematic illustration of a block arrangement of code for permitting copying twice that can be used for the first embodiment;

FIG. 13 is a schematic illustration of a block arrangement of code of prohibiting copying that can be used for a second embodiment of the invention;

FIG. 14 is a schematic illustration of a block arrangement of code for permitting copying only once that can be used for the second embodiment;

FIG. 15 is a schematic illustration of a block arrangement of code for permitting copying twice that can be used for the second embodiment;

FIG. 21 is a chart of 5-bit data format that can be used for the purpose of the invention;

FIG. 22 is a 3-bit<———>5-bit conversion table that can be used for the fourth embodiment arranged to permit copying;

FIG. 23 is a 3-bit<———>5-bit conversion table that can be used for the fourth embodiment arranged to prohibit copying;

FIG. 24 is a 3-bit<———>5-bit conversion table that can be used for the fourth embodiment arranged to prohibit copying, using a conversion table obtained by partly modifying the table for permitting copying;

DETAILED DESCRIPTION OF THE INVENTION

Before describing preferred embodiments of the invention, a code pattern image that can be used for the purpose of the invention will be briefly discussed.

Figure 1:
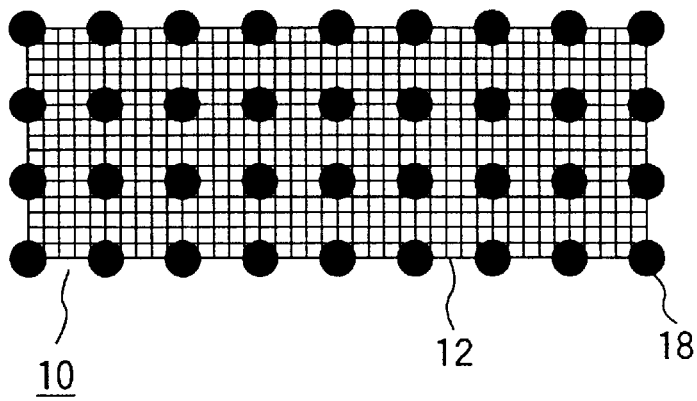
FIG. 1 is a code pattern image that can be used with a code reading and recording apparatus according to the invention.

Referring to FIG. 1, a code pattern image 10 designed for the purpose of the invention and printed on a recording medium such as a sheet of paper comprises a plurality of regularly arranged blocks 12, each having a set of predetermined unit dots. From a macroscopic point of view, each of the blocks having a set of predetermined number of dots will be recognized as a block having a given density.

Figure 2:
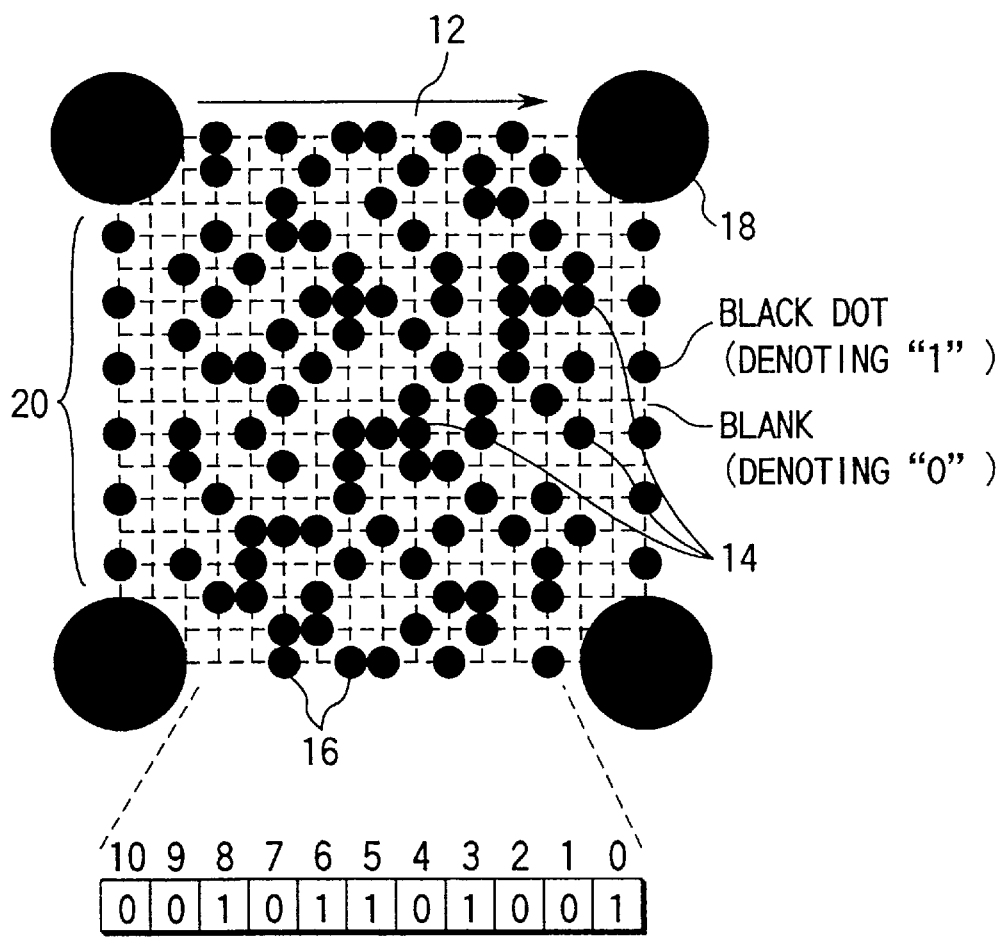
FIG. 2 is a detailed illustration of a block of the code pattern image of FIG. 1.

FIG. 2 is an enlarged view of a single block of the blocks of FIG. 1. Referring to FIG. 2, the block 12 contains a combination of a data dot pattern 14 arranged in accordance with the contents of the data to be recorded and a block header pattern 16 arranged with a predetermined positional relationship relative to the data dot pattern 14 and carrying information including the address of the block. Additionally, the block is provided with markers 18 and a matching dot pattern 20 that are arranged at respective predetermined positions relative to the block. In the example of FIG. 2, the markers 18 are located at the four corners of the block and the matching dot pattern 20 is positioned on the lateral boundaries separating the block from the adjacent blocks. Note that the block header pattern 16 also has a predetermined positional relationship relative to the markers 18 and located at the top and the bottom of the block in FIG. 2. Note that all the dots of the matching dot pattern 20, the block header pattern 16 and the data dot pattern 14 have an identical size. Each of the markers 18 has an area greater than that of each of the dots. For example the markers may be in the form of a circle having a diameter five times greater than that of the dots on the recording medium.

The data to be recorded as a code pattern image is subjected to modulation in advance as will be described hereinafter. Modulation as used herein refers to a process of limiting the number of consecutively arranged dots so that dots and markers may be discriminated without fail. If, for example, the marker has a diameter five times greater than the dot, the number of consecutively arranged dots has to be equal to or less than four. Thus, the modulation will be a 4–5 modulation where a redundancy bit is added to each 4-bit data. Typically, a modulation table will be selected out of a number of prearranged modulation tables in order to ensure that the largest number of consecutive dots does not exceed four.

In the block header pattern 16 of FIG. 2, each of the crossings where a dot is found represents "1", whereas each of the crossings where no dot is found represents "0". The block header pattern 16 can be made to carry information on the modulation table being used and control data in addition to the information on the block address. Therefore, the data of the block header pattern are non-modulated data.

The code pattern image 10 will be taken up for use typically by manually scanning the image by means of a code pattern image input device (not shown). In the process of reading a code pattern image, firstly the locations of the markers 18 are detected and used as references for accurately determining the position of the code in a picked-up CCD image covering a plurality of frames before the data dot pattern 14 in the block 12 is read. For determining the locations of the markers 18 are determined, firstly they are detected and the matching dot pattern 20 arranged between the block and the related adjacent blocks are searched to determine the values of the coordinates of the centorid of each of the dots of the matching dot pattern 20. Then, the values of the coordinates of each of the markers 18 are accurately corrected by means of the centorids of the dots, using the least square method. A method described in EP 0,717,398 A2 can be used to accurately read a code pattern image for the purpose of the invention and hence will not be described here any further.

Now, preferred embodiments of the present invention will be described below.

1st Embodiment

Figure 3:
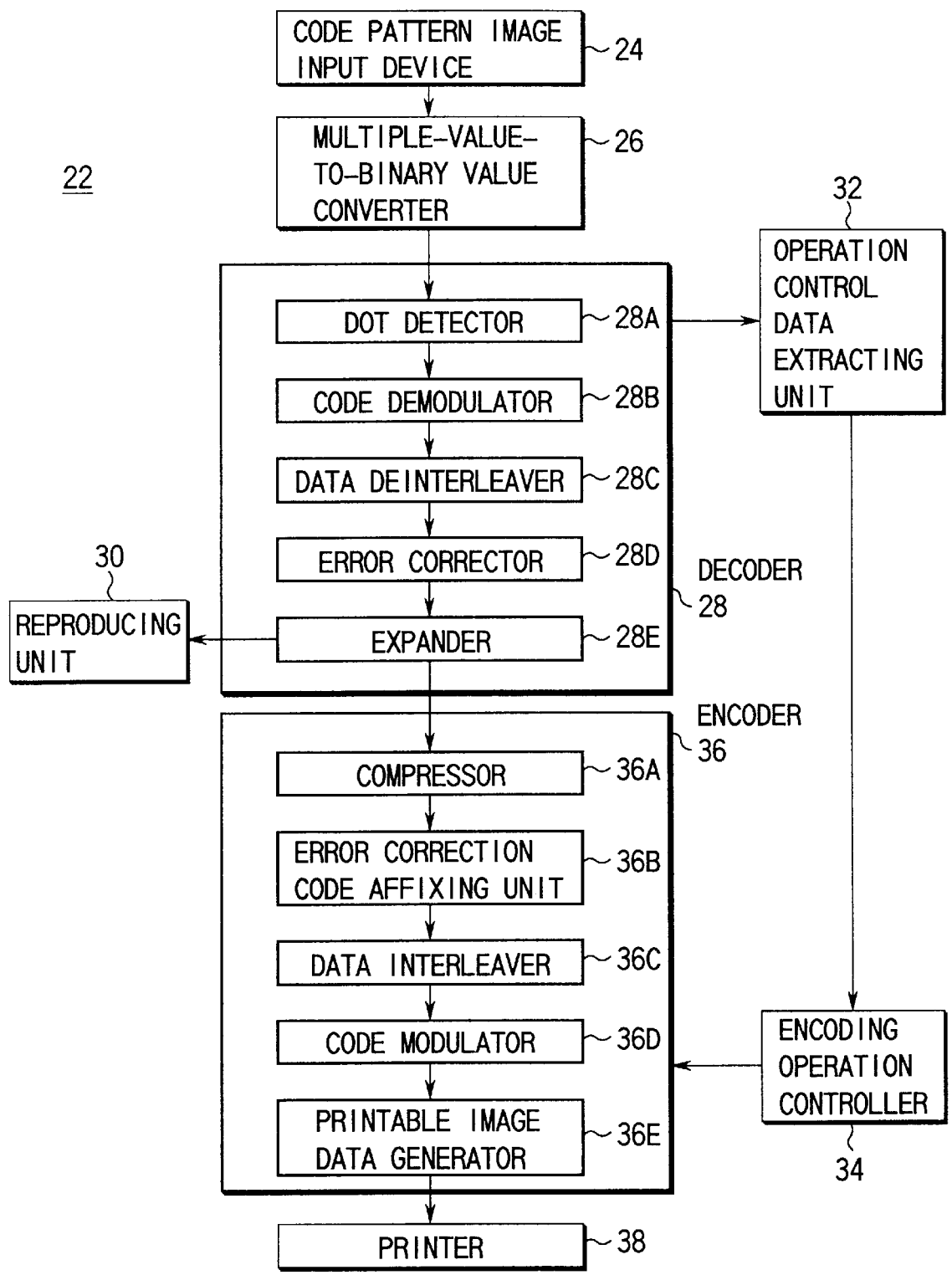
FIG. 3 is a schematic block diagram of a first embodiment of code reading and recording apparatus according to the invention.

FIG. 3 is a schematic block diagram of a first embodiment of code reading and recording apparatus 22 according to the invention.

This embodiment of code reading and recording apparatus 22 comprises a code pattern image input device 24, a multiple-value-to-binary-value converter 26, a decoder 28, a reproducing unit 30, an operation control data extracting unit 32, an encoding operation controller 34, an encoder 36 and a printer 38.

The code pattern image input device 24 may be an optical device or a CCD unit for picking up and reading a code pattern image 10. The multiple-value-to-binary-value converter 26 transforms the multiple-value image data picked up by the code pattern image input device 24 into binary data.

The decoder 28 restores the original multi-media data including audio data, video data and digital code data and recorded on the recording medium as a code pattern image 10 from the binary image data produced by the multiple-value-to-binary value converter 26. The decoder 28 includes a dot detector 28A, a code demodulator 28B, a data deinterleaver 28C, an error corrector 28D and an expander 28E.

Figure 4:
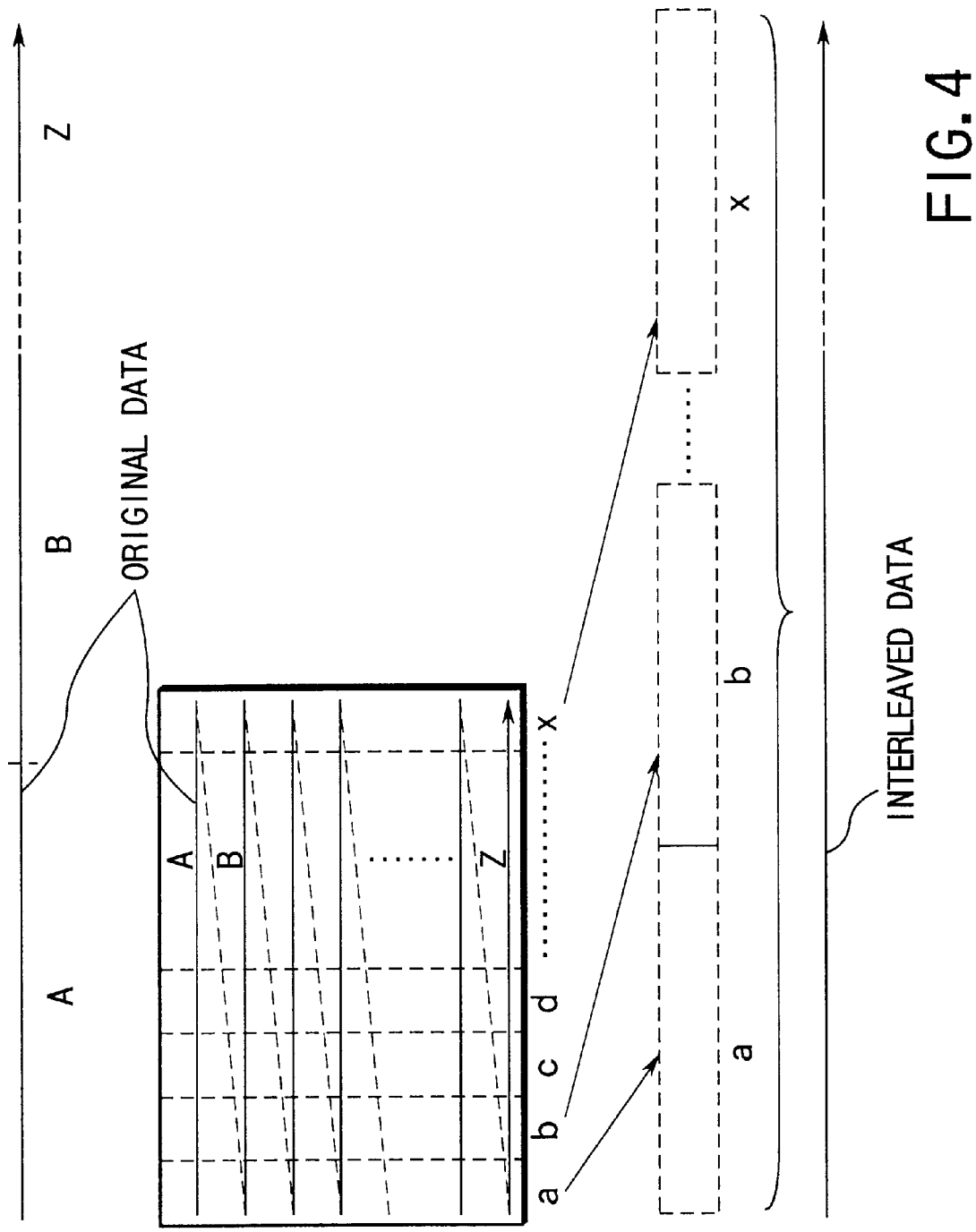
FIG. 4 is a schematic illustration of an interleaving operation.

The dot detector 28A detects the dots in each block of the code pattern image 10 by means of a known method from the image data that have been transformed into binary data by the multiple-value-to-binary value converter 26. The code demodulator 28B demodulates the dot data modulated at the time of recording and detected by the dot detector 28A. Similarly, the data deinterleaver 28C performs deinterleaving on the data demodulated by the code demodulator 28B, which has been interleaved, when recorded, in order not to contain burst errors. The data is thereby restored to the form it has before it was subjected to interleaving. The term "interleaving" as used herein refers to dividing data into parts having a predetermined length and arranging them in such a way that they may be shuffled appropriately as seen from FIG. 4. The error corrector 28D corrects any errors in the data deinterleaved by the data deinterleaver 28C. The expander 28E expands the data corrected by the error corrector 28D to restore the original data because the data was compressed at the time of recording.

The reproducing unit 30 outputs the original data including audio data, video data and digital code data that has been deinterleaved, corrected for errors and expanded by the decoder 28.

The operation control data extracting unit 32 extracts control data from the dots detected by the dot detector 28A of the decoder 28 or the data processed in each of the processing steps as will be described hereinafter. The encoding operation controller 34 controls the encoder 36 and permits or prohibits an encoding operation by the encoder 36 according to the operation control data extracted by the operation control data extracting unit 32.

The encoder 36 is adapted to perform an operation of compressing a data, adding an error correcting code to it, interleaving it and then modulating it. Thus, it includes a compressor 36A, an error correction code affixing unit 36B, a data interleaver 36C, a code modulator 36D and a printable image data generator 36E.

The compressor 36A compresses the data fed from the expander 28E of the decoder 28. The error correction code affixing unit 36B adds an error correction code to the data compressed by the compressor 36A. The data interleaver 36C rearranges the data having an error correction code affixed to it by the error correction code affixing unit 36B so as to prevents any consecutive reading errors (burst error) from occurring due to smears on the printed surface of a recording medium that have been given rise to for some reason or other. The code modulator 36D modulates the data rearranged by the data interleaver 36C to produce a modulated data. The printable image data generator 36E generates a printable image data to be used for printing on a recording medium from the encoded data that has been modulated by the code modulator 36D.

The printer 38 prints the printable image data generated by the printable image data generator 36E of the encoder 36 as a code pattern image 10 on a recording medium such as a sheet of paper.

Thus, the encoding operation controller 34 permits or prohibits the current encoding operation of the encoder 36 according to the operation control data extracted by the operation control data extracting unit 32. When the data on a code pattern image is determined to be prohibiting copying the image, the encoder 36 is made unoperational. Therefore, with this arrangement, the code pattern image of the data can be prevented from being copied in a simple manner.

The encoding operation controller 34 may be made to control not only the encoder 36 but also the decoder 28 so that the data on a code pattern image will be neither decoded nor reproduced when copying the image is prohibited.

Figure 5:
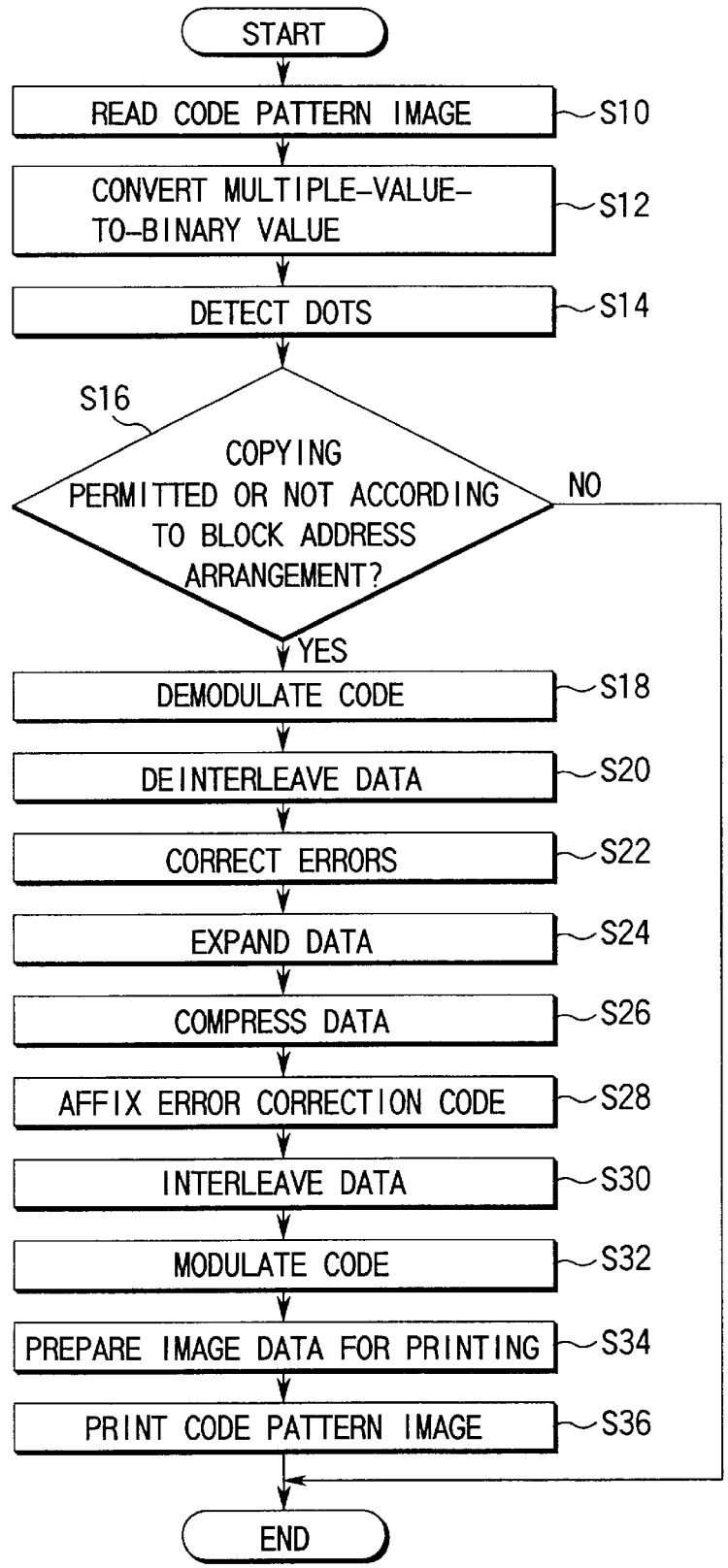
FIG. 5 is a schematic flow chart of the operation of the first embodiment.

FIG. 5 is a schematic flow chart of the above described operation of the first embodiment of code reading and recording apparatus. Note that the apparatus reads a code pattern image 10 printed on a recording medium and prints an identical code pattern image on some other recording medium.

Referring to FIG. 5, firstly the code pattern image input device 24 picks up and reads the code pattern image 10 printed on a recording medium (not shown) (Step S10). Then, the multi-valued image data that has been picked up is then transformed into a binary value data by the multiple-value-to-binary value converter 26 (Step S12). The binarized image data is then fed to the dot detector 28A of the decoder 28, where the dot detectors 28A detects the dots of the code pattern image as the smallest units (Step S14).

At this stage, the operation control data extracting unit 32 extracts the operation control data contained in the image data. An operation control data is a data describing one or more than one characteristic aspects of the physical structure of the code pattern image 10. For example, it may be a block header pattern 16 contained in the code pattern image 10 that describes how the blocks 12 of the code pattern image are arranged as will be described in greater detail hereinafter. Then, the encoding operation controller 34 determines if the operation control data permits copying the image or not according to the data on the arrangement of the blocks (Step S16). If it is determined in Step S16 that the operation control data does not permit copying the image, the entire operation will be terminated at this point.

If, on the other hand, it is determined in Step S16 that the operation control data permits copying the image, the code demodulator 28B of the decoder 28 demodulates the modulated data that comprised the detected dots (Step S18). Since the data has been interleaved (rearranged) in order to prevent any loss of data from taking place due to consecutive dot detection errors, the data deinterleaver 28C deinterleaves (restores the original arrangement of) the data (Step S20). Then, the error corrector 28D corrects any errors in the data (Step S22) and the expander 28E expands the data to completely restore the original multi-media data (Step S24).

Thereafter, the compressor 36A compresses the restored multi-media data (Step S26) and the error correction code affixing unit 36B adds an error correction code to the data (Step S28). Then, the data interleaver 36C interleaves (rearranges) the data in order to prevent an loss of data from taking place due to consecutive dot detection errors (Step S30) and the code modulator 36D modulates the code (Step S32). Thus, the data that has been compressed, affixed with an error correction code, rearranged and modulated is utilized by the printable image data generator 36E to produce a corresponding code pattern image containing markers in order to print the image on a recording medium (Step S34). The printer 38 then prints the code pattern image (Step S36).

In order to determine with ease if copying the picked up code pattern image is permitted or prohibited, the one or more than one characteristic aspects of the physical structure of the picked up code pattern image may advantageously be used so that, unlike any known comparable conventional methods, the data of the code pattern image that should not be copied is exempted from the operation of being demodulated and deinterleaved to improve the overall efficiency of the embodiment.

Figure 6:
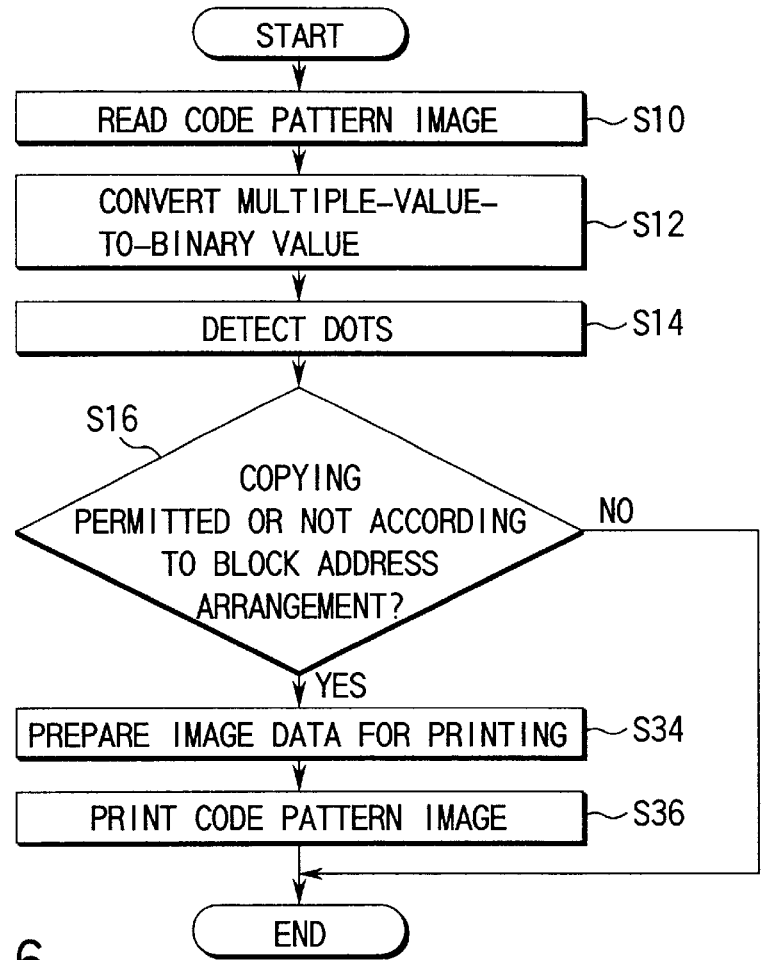
FIG. 6 is a schematic flow chart of the operation of an embodiment obtained by modifying the first embodiment.

If copying the code pattern image is permitted and it is clear that the code pattern image can be picked up and copied on a recording medium by printing without infringing the copyright so that the control data does not have to be retrieved at all, the embodiment operates, following the flow chart of FIG. 6.

Referring to FIG. 6, firstly the code pattern image input device 24 picks up and reads the code pattern image 10 printed on the recording medium (Step S10). Then, the multi-valued image data that has been picked up is then transformed into a binary value data (Step S12). The binarized image data is then fed to the dot detector 28A, which detects the dots of the code pattern image as the smallest units (Step S14) and the data on the address arrangement of the block 12 in the code pattern image 10 is used to determine if copying the code pattern image is permitted or not (Step S16). If it is determined in Step S16 that copying the code pattern image is permitted, the printable image data is directly drawn out of the data that has been subjected to a multiple-value-to-binary value transformation and used for dot detection (Step S34) and then the image will be printed (Step S36).

With this embodiment, therefore, the steps of demodulation, deinterleaving, error correction, expansion, compression, affixture of an error correction code and code modulation can be effectively eliminated to realize an efficient image copying operation.

Figure 7:
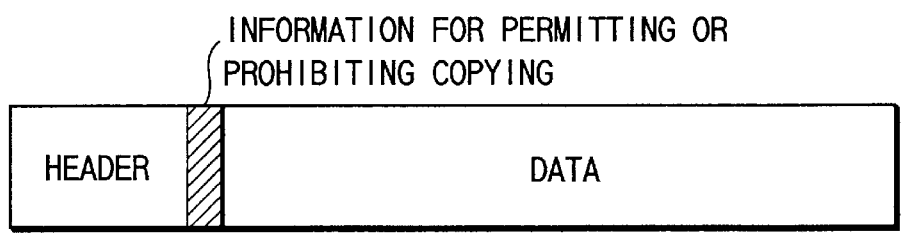
FIG. 7 is a schematic illustration of a logical structure of a code having a header providing conditions for copying that can be used for a known apparatus of the type under consideration.
Figure 8:
FIG. 8 is a schematic illustration of the logical structure of a code having an address block arrangement for providing conditions for copying that can be used for the first embodiment.

Unlike the known technique of making a header or a footer contain an operation control data for permitting or prohibiting the operation of copying the original code pattern image as shown in FIG. 7, the operation control data of this embodiment is a data on the arrangement of blocks obtained from the block header pattern 16 or, in other words, a data describing one or more than one characteristic aspects of the physical structure of the code pattern image so that the head or the footer does not have to contain such an operation control data as shown in FIG. 8 and hence more image data can be stored in the code pattern image.

Now, how the block header pattern 26 is made to provide data on the arrangement of blocks 12 in a code pattern image 10 will be described. Assume here that a code pattern image as shown in FIG. 9 comprises a total of 2×8 rectangularly parallelepipedic blocks containing respective addresses in the inside and that 8 blocks are used as a unit for interleaving.

Assume also that copying the code pattern image is permitted without restrictions when the block addresses are arranged in the ascending order as shown in FIG. 9.

On the other hand, it is assumed that copying the code pattern image is prohibited when the block addresses are arranged as shown in FIG. 10, where the block addresses of the leading two blocks of each unit of 8 blocks for interleaving are inverted.

FIG. 11 shows the block arrangement for permitting copying the code pattern image only once. In FIG. 11, the block addresses of the third and fourth blocks of each unit of eight blocks for interleaving are inverted from the arrangement of FIG. 9 for permitting copying the code pattern image without restrictions. Similarly, FIG. 12 shows the block arrangement for permitting copying the code pattern image twice. In FIG. 12, the block addresses of the fifth and sixth blocks of each unit of eight blocks for interleaving are inverted from the arrangement of FIG. 9 for permitting copying the code pattern image without restrictions.

With the block arrangement of FIG. 12 for permitting copying the code pattern image twice, the encoding operation controller 34 controls the encoder 36 so as to make it rearrange the code pattern image with the block arrangement of FIG. 12 into that of FIG. 11 when reading and printing the code pattern image.

Likewise, with the block arrangement of FIG. 11 for permitting copying the code pattern image only once, the encoding operation controller 34 controls the encoder 36 so as to make it rearrange the code pattern image with the block arrangement of FIG. 11 into that of FIG. 10 when reading and printing the code pattern image.

When a code pattern image having the block arrangement of FIG. 10 is read, the encoding operation controller 34 forbids the encoder 36 to operate and does not allow to copy the code pattern image by printing because copying the image is prohibited.

Thus, the operation of copying the original code pattern image can be controlled for the number of copies by unequivocally defining the arrangement of block addresses as shown in FIG. 11 or 12 that is different from the block address arrangement for permitting copying the code pattern image without restrictions and the arrangement for totally prohibiting copying the code pattern image.

2nd Embodiment

Now, a second embodiment of the invention will be described. Note that a code pattern image as illustrated in FIGS. 1 and 2 can also be used with the second embodiment. Furthermore, this second embodiment of code reading and recording apparatus according to the invention has a configuration as shown in FIG. 3 and described above for the first embodiment. Hence, the flow chart of the operation of reading a printed code pattern image and printing an identical code pattern image on a recording medium as illustrated in FIG. 5 is also applicable to the second embodiment.

However, in this second embodiment, all the block addresses will be shifted to control the copying operation.

If it is assumed here again that copying the code pattern image is permitted without restrictions when the block addresses starts from "1" and are arranged in the ascending order as shown in FIG. 9, the arrangement of block addresses starting from "11" as shown in FIG. 13 may be used to prohibit copying the code pattern image.

Then, the block address arrangement of FIG. 14 obtained by adding "1" to each of the addresses of FIG. 9 so that the addresses are arranged in the ascending order and starts from "2" may be used to tell that copying the image is permitted for only once. Likewise, the block address arrangement of FIG. 15 obtained by adding "2" to each of the addresses of FIG. 9 so that the addresses are arranged in the ascending order and starts from "3" may be used to tell that copying the image is permitted for twice.

With the block arrangement of FIG. 15 for permitting copying the code pattern image twice, the encoding operation controller 34 controls the encoder 36 so as to make it rearrange the code pattern image with the block arrangement of FIG. 15 into that of FIG. 14 when reading and printing the code pattern image.

Likewise, with the block arrangement of FIG. 14 for permitting copying the code pattern image only once, the encoding operation controller 34 controls the encoder 36 so as to make it rearrange the code pattern image with the block arrangement of FIG. 14 into that of FIG. 13 when reading and printing the code pattern image.

When a code pattern image having the block arrangement of FIG. 13 is read, the encoding operation controller 34 forbids the encoder 36 to operate and does not allow to copy the code pattern image by printing because copying the image is prohibited.

Thus, the operation of copying the original code pattern image can be controlled for the number of copies by unequivocally defining the arrangement of block addresses as shown in FIG. 14 or 15 that is different from the block address arrangement for permitting copying the code pattern image without restrictions and the arrangement for totally prohibiting copying the code pattern image.

Thus, an operation control data can be conveyed by the arrangement of block addresses to make the code reading and recording apparatus efficiently realize a status where copying an code pattern image is permitted or prohibited without reducing the data storage area in the code pattern image.

3rd Embodiment

Now, a third embodiment of the invention will be described. Note that a code pattern image as illustrated in FIGS. 1 and 2 can also be used with the third embodiment. Furthermore, this third embodiment of code reading and recording apparatus according to the invention has a configuration as shown in FIG. 3 and described above for the first embodiment.

Figure 16:
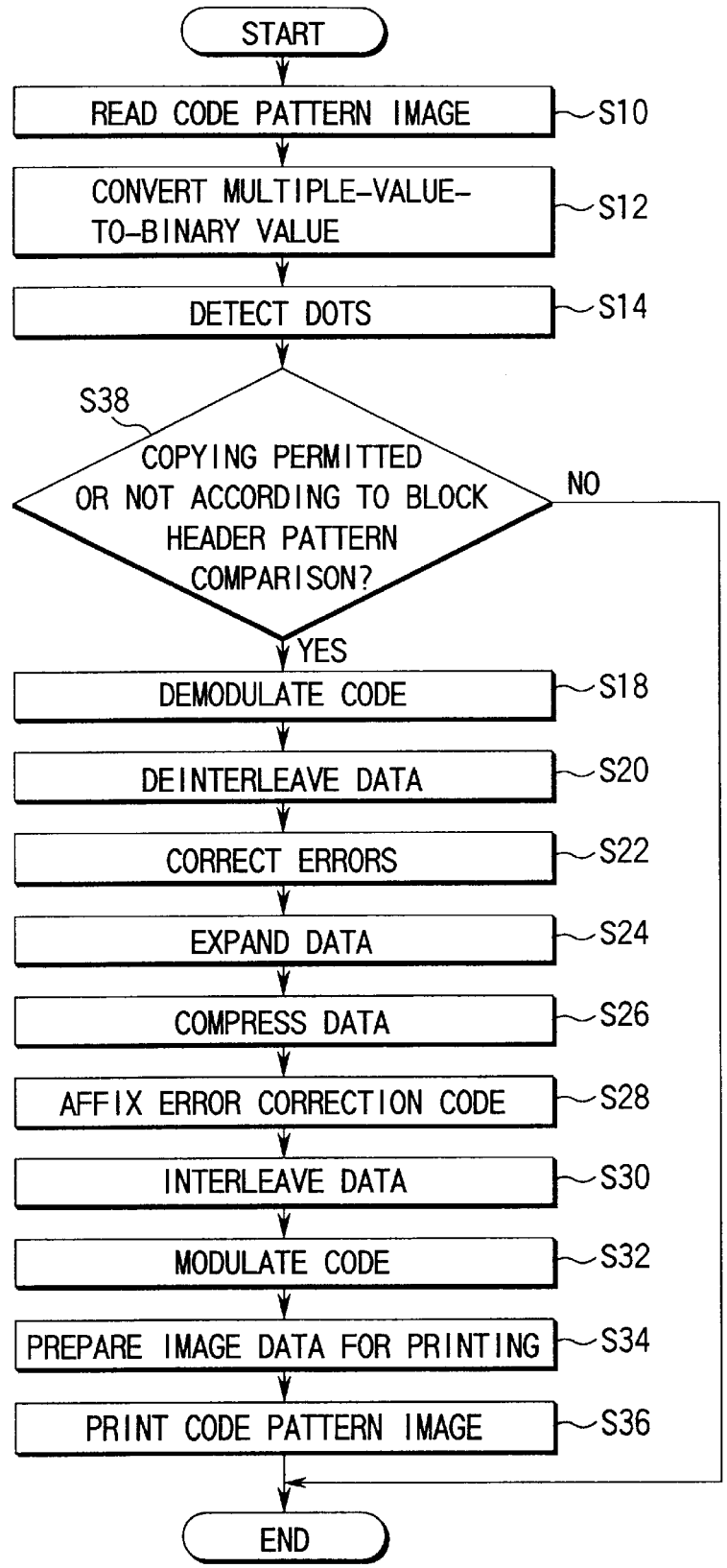
FIG. 16 is a schematic flow chart of the operation of a third embodiment of the invention.

FIG. 16 is a schematic flow chart of the operation of the third embodiment of code reading and recording apparatus. Note that the apparatus reads a code pattern image 10 printed on a recording medium and prints an identical code pattern image on some other recording medium.

Referring to FIG. 16, firstly the code pattern image input device 24 picks up and reads the code pattern image 10 printed on a recording medium (not shown) (Step S10). Then, the multi-valued image data that has been picked up is then transformed into a binary value data by the multiple-value-to-binary value converter 26 (Step S12). The binarized image data is then fed to the dot detector 28A of the decoder 28, where the dot detectors 28A detects the dots of the code pattern image as the smallest units (Step S14). At this stage, the embodiment recognizes the block header pattern contained in the code pattern image.

Now, a block header pattern 16 that can be used for this embodiment will be described by referring to FIG. 17. The block header comprises 11 bits, of which 6 bits are used for block addresses 16A and 4 bits out of the remaining 5 bits are used to indicate the number of blocks contained in an interleaved unit that have been rearranged according to a restoration parameter data (hereinafter referred to as interleaved block unit 16B). Of the data contained in the block header, while the block addresses 16A are uniquely allocated to the respective blocks, the interleaved block unit 16B is typically used to assign a same and identical data to all the blocks. Thus, a control data can be conveyed by the block header pattern and retrieved by the apparatus by placing unique data in some of the blocks that are supposed to contain a common data. Note that the last bit of the 11-bit block header is used to indicate the mode of modulation 16C.

Then, the operation control data extracting unit 32 compares the blocks of the block header pattern with each other to detect any differences existing there in order to determine if copying the code pattern image is prohibited or permitted. If it is determined that the operation control data does not permit copying the image, the entire operation will be terminated at this point.

If, on the other hand, it is determined that the operation control data permits copying the image, the code demodulator 28B of the decoder 28 demodulates the modulated data that comprised the detected dots (Step S18). Since the data has been interleaved (rearranged) in order to prevent any loss of data from taking place due to consecutive dot detection errors, the data deinterleaver 28C deinterleaves (restores the original arrangement of) the data (Step S20). Then, the error corrector 28D corrects any errors in the data (Step S22) and the expander 28E expands the data to completely restore the original multi-media data (Step S24).

Thereafter, the compressor 36A compresses the restored multi-media data (Step S26) and the error correction code affixing unit 36B adds an error correction code to the data (Step S28). Then, the data interleaver 36C interleaves (rearranges) the data in order to prevent an loss of data from taking place due to consecutive dot detection errors (Step S30) and the code modulator 36D modulates the code (Step S32). Thus, the data that has been compressed, affixed with an error correction code, rearranged and modulated is utilized by the printable image data generator 36E to produce a corresponding code pattern image containing markers in order to print the image on a recording medium (Step S34). The printer 38 then prints the code pattern image (Step S36).

Now, examples of address arrangement that can be used for this embodiment will be described by referring to FIGS. 18 and 19.

Figure 18:
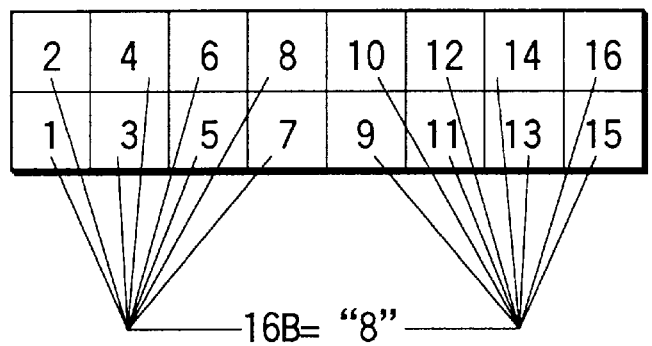
FIG. 18 is a schematic illustration of a block arrangement of code for permitting free copying that can be used for the third embodiment.
Figure 19:
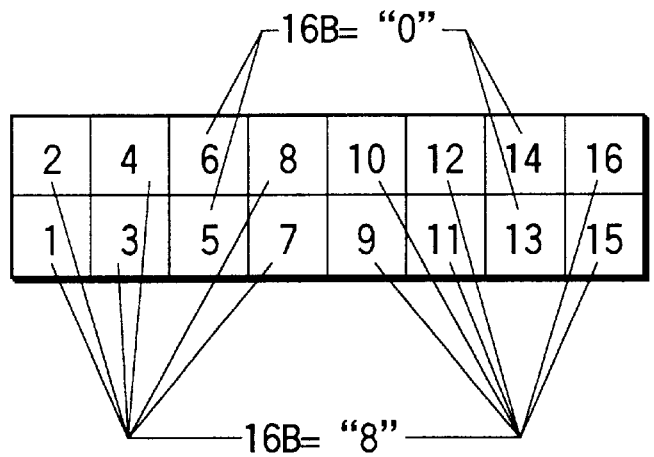
FIG. 19 is a schematic illustration of a block arrangement of code for prohibiting copying that can be used for the third embodiment.

In FIG. 18, the interleaved block unit 16B comprises a total of 8 blocks and, when copying a code pattern image is permitted without restrictions, a value of "8" is set in the interleaved block units 16B of all the block headers of block "1" through block "16". When, on the other hand, copying the code pattern image is prohibited, a value of "0" is set in the interleaved block unit 16B of each of the block headers of blocks "5", "6", "13", and "14" as shown in FIG. 19.

Thus, if copying the code pattern image is permitted or prohibited can be determined at the time of recognizing the block header patterns 16 by comparing the value of the interleaved block unit 16B of each of the block headers of blocks "5", "6", "13", and "14" with the value of the block headers of the remaining blocks and utilizing the different as control data so that the operation data does not require any specific data storage area in the code pattern image 10 and hence the data storage area in the code pattern image is not reduced by the operation data.

4th Embodiment

Now, a fourth embodiment of the invention will be described. Note that a code pattern image as illustrated in FIGS. 1 and 2 can also be used with the fourth embodiment. Furthermore, this fourth embodiment of code reading and recording apparatus according to the invention has a configuration as shown in FIG. 3 and described above for the first embodiment.

Figure 20:
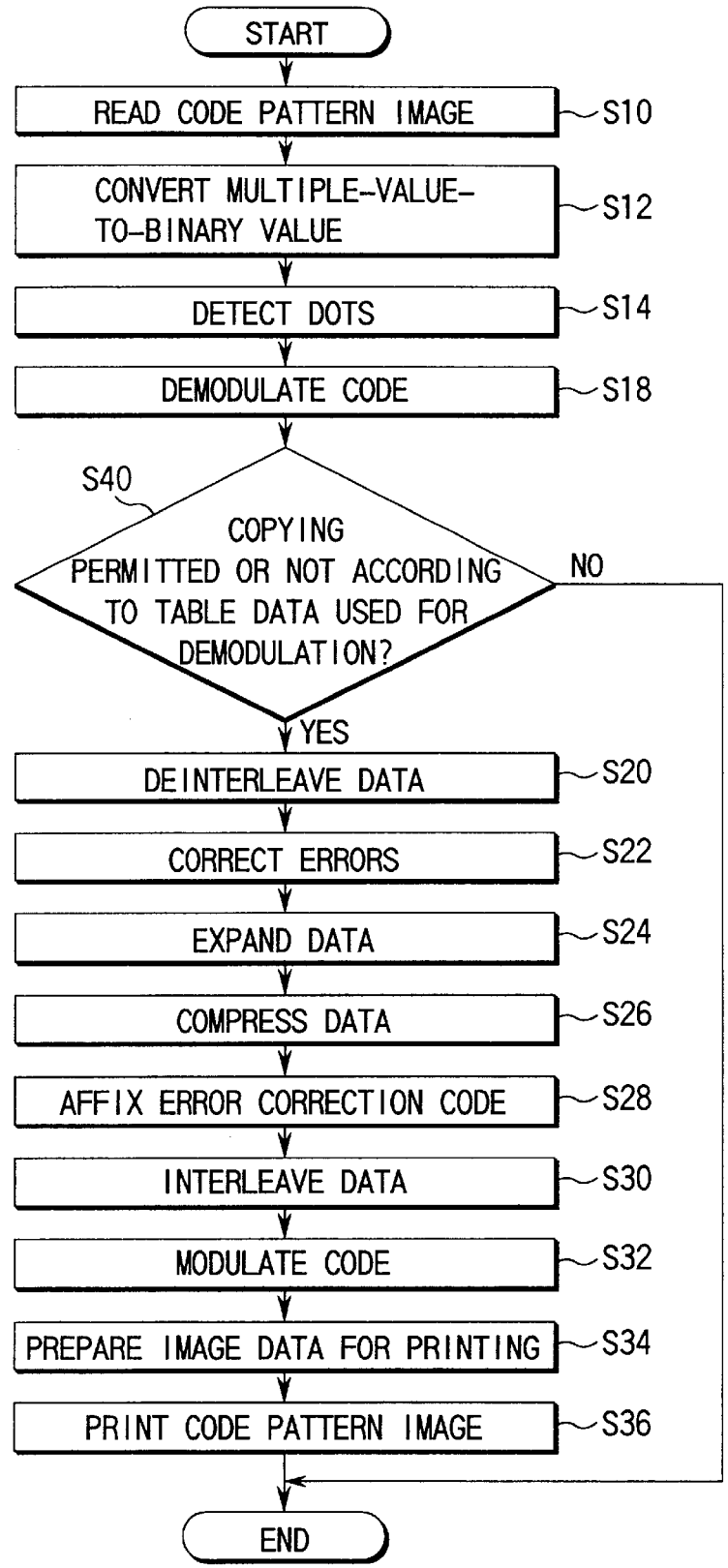
FIG. 20 is a schematic flow chart of the operation of a fourth embodiment of the invention.

FIG. 20 is a schematic flow chart of the operation of the fourth embodiment of code reading and recording apparatus. Note that the apparatus reads a code pattern image 10 printed on a recording medium and prints an identical code pattern image on some other recording medium.

Referring to FIG. 20, firstly the code pattern image input device 24 picks up and reads the code pattern image 10 printed on a recording medium (not shown) (Step S10). Then, the multi-valued image data that has been picked up is then transformed into a binary value data by the multiple-value-to-binary value converter 26 (Step S12). The binarized image data is then fed to the dot detector 28A of the decoder 28, where the dot detectors 28A detects the dots of the code pattern image as the smallest units (Step S14). The code demodulator 28B of the decoder 28 demodulates the modulated data recognized from the detected dots (Step S18).

With this embodiment, the modulation table to be used is selected out of a number of tables at the time of the modulating operation according to the control data for permitting or prohibiting copying the code pattern image so that the demodulator may recognize the control data by referring to the conversion table to be referred to for the demodulating operation. This procedure will be described by referring to an example where code pattern is provided by transforming a 3-bit data into a redundant 5-bit data.

Referring to FIG. 21, a 5-bit data format can be used for 32 different data. On the other hand, a 3-bit data format can be used for 8 different data. Therefore, with this embodiment, a 3-bit to 5-bit conversion table (equivalent with a 3-bit<———>5-bit conversion table) is used for only 8 different data although it can be used for 32 different data.

FIG. 22 shows a 3-bit<———>5-bit conversion table to be used for permitting copying without restrictions. FIG. 23 shows a 3-bit<———>5-bit conversion table to be used for prohibiting copying a code pattern image. Since the 5-bit data to be used for permitting copying a code pattern image are totally different from those to be used for prohibiting copying the image, the two instances can be clearly discriminated by recognizing the modulated data. Note that, in FIGS. 22 and 23, it is so arranged that the largest number of consecutive "1" in the modulated data does not exceed four in order to prevent any data dots from being erroneously recognized as a marker 18 in the operation of recognizing blocks 12 by means of markers 18 as in the case of FIG. 2.

Then, the operation control data extracting unit 32 determines if copying the code pattern image is permitted or prohibited by recognizing the modulated data (Step S40). If it is determined in Step S40 that copying the image is prohibited, the entire operation will be terminated at this point.

If, on the other hand, it is determined that the operation control data permits copying the image, since the data has been interleaved (rearranged) in order to prevent any loss of data from taking place due to consecutive dot detection errors, the data deinterleaver 28C deinterleaves (restores the original arrangement of) the data (Step S20). Then, the error corrector 28D corrects any errors in the data (Step S22) and the expander 28E expands the data to completely restore the original multi-media data (Step S24).

Thereafter, the compressor 36A compresses the restored multi-media data (Step S26) and the error correction code affixing unit 36B adds an error correction code to the data (Step S28). Then, the data interleaver 36C interleaves (rearranges) the data in order to prevent an loss of data from taking place due to consecutive dot detection errors (Step S30) and the code modulator 36D modulates the code (Step S32). Thus, the data that has been compressed, affixed with an error correction code, rearranged and modulated is utilized by the printable image data generator 36E to produce a corresponding code pattern image containing markers in order to print the image on a recording medium (Step S34). The printer 38 then prints the code pattern image (Step S36).

It will be appreciated that the above arrangement can be used not only for a given number of consecutive "1"s (or "0"s) but also for predetermined combinations of "1"s and "0"s designed as discriminable from a marker 18.

Thus, as described above, a number of different tables for modulation and demodulation are used so that the operation data does not require any specific data storage area in the code pattern image for a header or a footer and hence the data storage area in the code pattern image is not reduced by the operation data.

While the data of the conversion table in FIG. 23 are totally different from those used the conversion table of FIG. 22, it will be appreciated that a conversion table shown in FIG. 24 and having some of the data in common with the table of FIG. 22 may alternatively be used.

More specifically, in FIG. 24, two 5-bit data of $(10001)_2$ and $(10100)_2$ are used respectively for two 3-bit data of $(001)_2$ and $(100)_2$ in order to tell that copying the code pattern image is prohibited in place of $(00001)_2$ and $(00100)_2$ in FIG. 22 telling that copying the code pattern image is permitted.

While two of the eight 3-bit data are transformed into different 5-bit data in FIGS. 22 and 24, only one of the eight 3-bit data may alternatively be transformed into different 5-bit data in FIGS. 22 and 24. Still alternatively, three or four 3-bit data may be transformed into different 5-bit data in FIGS. 22 and 24.

5th Embodiment

Now, a fifth embodiment of the invention will be described. Note that a code pattern image as illustrated in FIGS. 1 and 2 can also be used with the fifth embodiment. Furthermore, this fifth embodiment of code reading and recording apparatus according to the invention has a configuration as shown in FIG. 3 and described above for the first embodiment.

Figure 25:
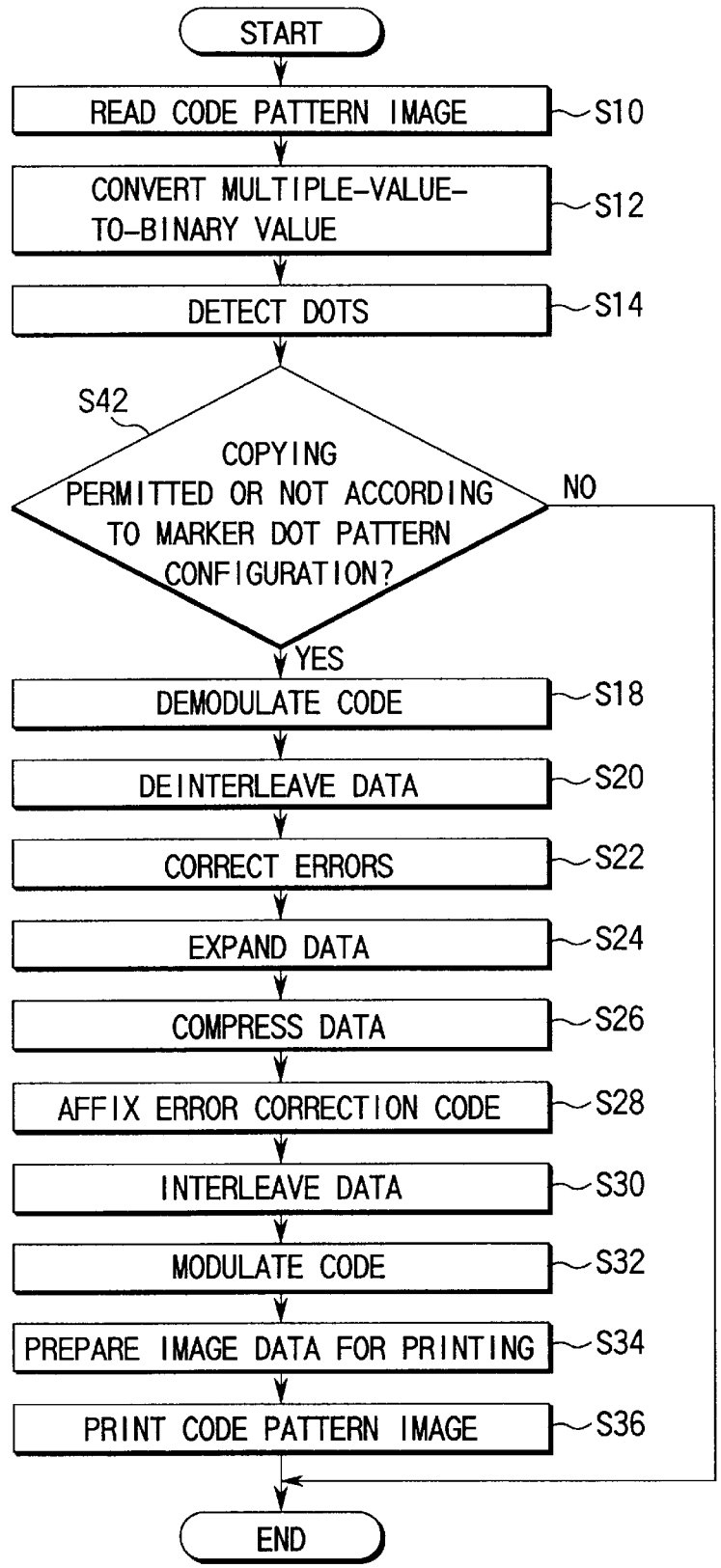
FIG. 25 is a schematic flow chart of the operation of a fifth embodiment of the invention.

FIG. 25 is a schematic flow chart of the operation of the fifth embodiment of code reading and recording apparatus. Note that the apparatus reads a code pattern image 10 printed on a recording medium and prints an identical code pattern image on some other recording medium.

Referring to FIG. 25, firstly the code pattern image input device 24 picks up and reads the code pattern image 10 printed on a recording medium (not shown) (Step S10). Then, the multi-valued image data that has been picked up is then transformed into a binary value data by the multiple-value-to-binary value converter 26 (Step S12). The binarized image data is then fed to the dot detector 28A of the decoder 28, where the dot detectors 28A detects the dots of the code pattern image as the smallest units (Step S14).

At this stage, the markers 18 in the blocks of the code pattern image 10 are recognized. If a plurality of dot patterns are predefined for markers 18, they can be utilized for control data so that the operation of controlling the process of copying a code pattern image can be realized by looking into the dot code patterns of the markers used for the code pattern image.

Then, the operation control data extracting unit 32 determines if copying the code pattern image is permitted or prohibited by recognizing the dot code patterns of the markers (Step S42). If it is determined in Step S42 that copying the image is prohibited, the entire operation will be terminated at this point.

If, on the other hand, it is determined that the operation control data permits copying the image, the code demodulator 28B of the decoder 28 demodulates the modulated data that comprised the detected dots (Step S18). Since the data has been interleaved (rearranged) in order to prevent any loss of data from taking place due to consecutive dot detection errors, the data deinterleaver 28C deinterleaves (restores the original arrangement of) the data (Step S20).

Then, the error corrector 28D corrects any errors in the data (Step S22) and the expander 28E expands the data to completely restore the original multi-media data (Step S24).

Thereafter, the compressor 36A compresses the restored multi-media data (Step S26) and the error correction code affixing unit 36B adds an error correction code to the data (Step S28). Then, the data interleaver 36C interleaves (rearranges) the data in order to prevent an loss of data from taking place due to consecutive dot detection errors (Step S30) and the code modulator 36D modulates the code (Step S32). Thus, the data that has been compressed, affixed with an error correction code, rearranged and modulated is utilized by the printable image data generator 36E to produce a corresponding code pattern image containing markers in order to print the image on a recording medium (Step S34). The printer 38 then prints the code pattern image (Step S36).

Figure 26A:
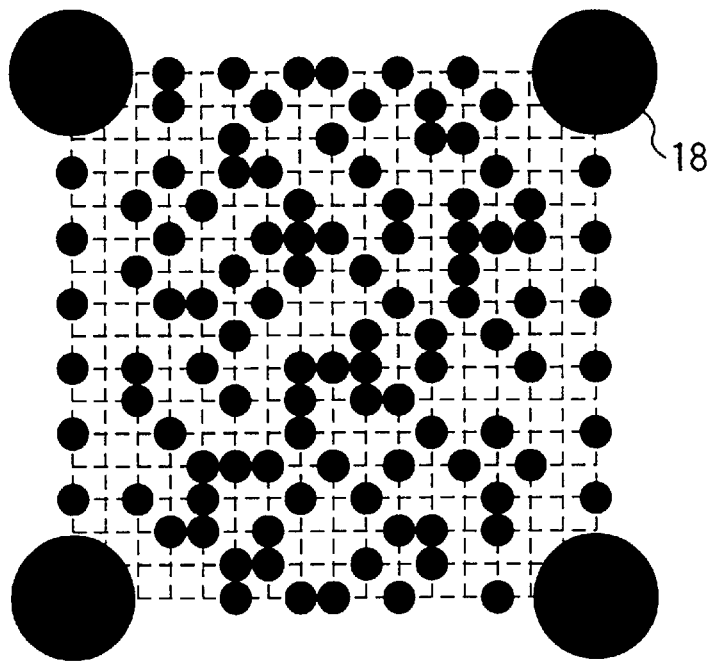
FIGS. 26A and 26B are schematic illustrations showing respectively markers and one of the markers that can be used for the fifth embodiment arranged to permit copying.
Figure 26B:
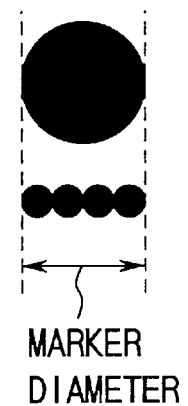
Figure 27A:
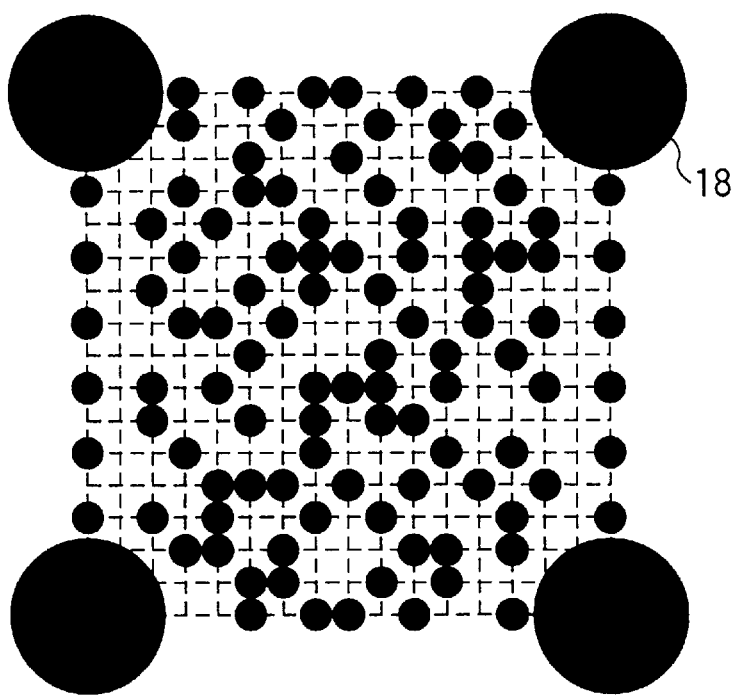
FIGS. 27A and 27B are schematic illustrations similar to FIGS. 26A and 26B but showing respectively markers and one of the markers that can be used for the fifth embodiment arranged to prohibit copying.
Figure 27B:
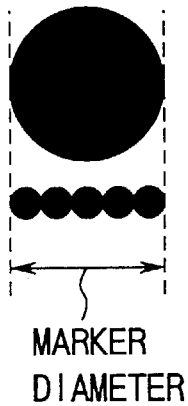

FIGS. 26A and 26B and FIGS. 27A and 27B show examples of dot patterns that can be used for markers 18. In FIGS. 26A and 26B, each marker 18 has a diameter equal to four times of the diameter of each black dot in the blocks that represents a 1-bit data. The markers may be used to indicate that copying the code pattern image is permitted. In FIGS. 27a and 27B, each marker 18 has a diameter equal to five times of the diameter of each black dot in the blocks that represents a 1-bit data. The markers may be used to indicate that copying the code pattern image is prohibited.

Thus, a control data can be conveyed by selecting appropriate physical structural characteristics of the code pattern image, which are the sizes of the markers contained in the code pattern image 10 in the above description, so that if copying the code pattern image is permitted or not can be determined efficiently by simply recognizing the sizes of the markers. Thus, the data storage area in the code pattern image is not reduced and hence can store a large volume of data.

While the sizes of the markers are used as physical structural characteristics in the above description, the gap separating the blocks, the dot size, the distance between adjacent markers an/or other physical structure characteristics may alternatively be used for the purpose of the invention.

While the present invention is described above by way of preferred embodiments, it will be understood by those who are skilled in the art that the present invention is by no means limited to the above embodiments, which may be modified in many different ways. For example, while audio data are used in the above description, the present invention is equally applicable to video data, digital code data and other multi-media data.

Thus, to conclude the description, the present invention can be summarily described as follows.

(1) A code reading and recording apparatus comprising:
a reading section (24, 26) for picking up and reading a code pattern image printed/recorded on a recording medium as data adapted to be picked up and read and containing at least one of an audio data, a video data and a digital code data;
a decoder (28) for decoding the code pattern image read by the reading section and retrieving the original data;
an encoder (36) for transforming the data retrieved by the decoder into an image data of a code pattern image; and
a recording section (38) for printing/recording the transformed image data on a predetermined recording medium as code pattern image adapted to be picked up and read;

characterized in that
the code pattern image contains an operation data for permitting or prohibiting the operation of the encoder; and
it further comprises:
an operation control data extracting section (32) for extracting the operation data from the code pattern image read by the reading section; and
an operation control section (34) for permitting or prohibiting the operation of the encoder according to the operation data extracted by the operation control data extracting section.

With such a code reading and recording apparatus, a code pattern image printed on a recording medium as data adapted to be picked up and read are actually picked up and read by the reading section. Then, the decoder decodes the code pattern image read by the reading section and retrieves the original data. Thereafter, the encoder transforms the data retrieved by the decoder into an image data of a code pattern image and the recording section prints the transformed image data on a predetermined recording medium as code pattern image adapted to be picked up and read. Furthermore, the code pattern image is made to contain an operation data for permitting or prohibiting the operation of the encoder so that the operation control data extracting section extracts the operation data from the code pattern image read by the reading section and the operation control section permits or prohibits the operation of the encoder according to the operation data extracted by the operation control data extracting section.

Thus, as the code pattern image is made to contain an operation control data so that the operation control data extracting section extracts the operation control data from the code pattern image to permit or prohibit the operation of the encoder in order to properly protect the copyright of the original data.

(2) A code reading and recording apparatus according to (1) above, characterized in that the operation control data extracting section extracts physical structural characteristics from the code pattern image as operation control data.

With this arrangement, physical structural characteristics such as the size of the markers of the code pattern image and/or the largest number of blocks are used for the operation control data as defined in (1) and the operation control data extracting section extracts these characteristics and the operation control section operates according to the extracted operation control data.

Thus, as physical structural characteristics are used for the operation control data, the apparatus can control its own operation once it realizes the physical structural characteristics of the code pattern image if it does not recognize all the internal data to consequently protect the copyright of the original data.

Additionally, since the physical structural characteristics are used to convey the operation control data without consuming the area for storing audio data, video data and/or digital code data of the code pattern image, the code pattern image can be thoroughly exploited for storing proper data because the operation control data does not require any data storage area.

(3) A code reading and recording apparatus according to (2) above, characterized in that the code pattern image is realized by arranging a plurality of adjacently locatable blocks (12), each comprising a data dot pattern (14) of a plurality of dot arranged according to the data to be transmitted, a marker (18) for recognizing the block and a block header pattern (16) containing a block address data (16A) for indicating the address of the arranged block, the data dot pattern, the marker and the block header pattern being arranged with a predetermined positional relationship, and that physical structural characteristics of the code pattern image are used as information indicating how addresses are allocated to the blocks of the code pattern image.

With this arrangement, the code pattern image is realized by arranging a plurality of adjacently locatable blocks, each of which comprises a data dot pattern of a plurality of dot arranged according to the data to be transmitted, a marker for recognizing the block and a block header pattern containing a block address data for indicating the address of the block arranged, and the data dot pattern, the marker and the block header pattern are arranged with a predetermined positional relationship. Additionally, physical structural characteristics of the code pattern image as described in (2) above are used to indicate how addresses are allocated to the blocks of the code pattern image.

Thus, when the code pattern image is picked up, the apparatus identifies the blocks by recognizing the markers and, once the apparatus recognizes the block header pattern, it can takes in the operation control data contained in the image so that it can control its own operation without recognizing the data contained in the blocks.

Additionally, since the physical structural characteristics are used to convey the operation control data without consuming the area for storing audio data, video data and/or digital code data of the code pattern image, the code pattern image can be thoroughly exploited for storing proper data because the operation control data does not require any data storage area.

(4) A code reading and recording apparatus according to (3) above, characterized in that the information indicating how addresses are allocated is extracted at least by using as a unit of operation a deinterleaving process of restoring the original arrangement of the data for dispersing them according to a predetermined rule in the interleaving process performed at the time of printing and recording the code pattern image.

Thus, the information indicating how block addresses are allocated as described in (3) is extracted at least for each code pattern image that corresponds to the data volume of an interleaving process of arranging the data to disperse them according to a predetermined rule performed at the time of printing and recording the code pattern image.

Generally, if interleaved data are used and error (burst error) occurs in continuously arranged data regions whose image is picked up for copying, the data can possibly be restored because the error is dispersed and not continuous. This is why interleaving is used. When the information indicating how addresses are allocated among blocks is contained in the data volume of an interleaving process, then the operation control data can be obtained by recognizing only the information on how block addresses are allocated in the code pattern image that corresponds to the interleaving process without recognizing the entire code pattern image.

Additionally, since the physical structural characteristics are used to convey the operation control data without consuming the area for storing audio, video data and/or digital code data of the code pattern image, the code pattern image can be thoroughly exploited for storing proper data because the operation control data does not require any data storage area.

(5) A code reading and recording apparatus according to (2) above, characterized in that the code pattern image is realized by arranging a plurality of adjacently locatable blocks (12), each comprising a data dot pattern (14) of a plurality of dot arranged according to the data to be transmitted, a marker (18) for recognizing the block and a block header pattern (16) containing a block address data (16A) for indicating the address of the arranged block, the data dot pattern, the marker and the block header pattern being arranged with a predetermined positional relationship, the block header pattern containing information on restoration parameters (16B) necessary for restoring the encoded data and commonly used for the block header patterns of the blocks, and that the differences among the data restoration parameters contained in each block header pattern are used as information indicating how addresses are allocated to the blocks of the code pattern image.

With this arrangement, the block header pattern contains information on restoration parameters necessary for restoring the encoded data and commonly used for the block header patterns of the blocks and the differences among the data restoration parameters contained in each block header pattern are used as information indicating how addresses are allocated to the blocks of the code pattern image.

Figure 17:
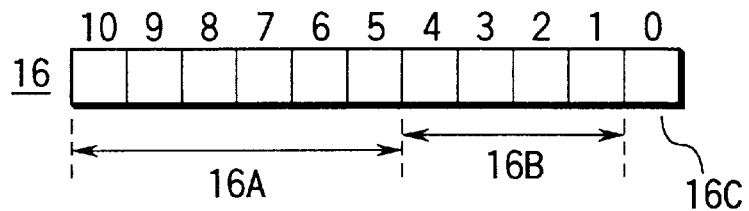
FIG. 17 is a schematic illustration of a block header pattern that can be used for the third embodiment.

As shown in FIG. 17, the block header pattern 16 contains the mode of modulation 16C, the interleaved block unit 16B and other information, of which the interleaved block unit shows a same and identical value for all the interleaved blocks. Therefore, the block header patterns can be made to carry an operation control data by varying the value in some of the blocks on purpose.

Thus, the operation control data can be retrieved to control the operation of the code reading and recording apparatus by simply recognizing the differences among a plurality of block header patterns without recognizing the data contained in the blocks.

Additionally, since the physical structural characteristics are used to convey the operation control data without consuming the area for storing audio, video data and/or digital code data of the code pattern image, the code pattern image can be thoroughly exploited for storing proper data because the operation control data does not require any data storage area.

(6) A code reading and recording apparatus according to (2) above, characterized in that the data is a data modulated to include predetermined redundant bits and the code pattern image is printed/recorded as an image adapted to be picked up and read and corresponding to the values of the bits of the modulated data and that the data on the physical structural characteristics of the code pattern image is a data on the mode of modulation relating to how predetermined redundant bits are added to the bits of the proper data.

Thus, when the data containing at least an audio data, a video data or some other data are modulated to include redundant bits and the code pattern image is printed/ recorded as an image corresponding to the values of the bits of the modulated data, the data on the physical structural characteristics of the code pattern image is a data on the mode of modulation relating to how predetermined redundant bits are added to the bits of the proper data.

Therefore, the operation control data is contained in the redundant bits of the modulated data and hence can be identified when the data is demodulated. Additionally, since the operation control data is contained in the redundant bits of the data, the data storage area of the code pattern image is not reduced by the operation control data.

(7) A code reading and recording apparatus according to (6) above, characterized in that the code pattern image is realized by arranging a plurality of adjacently locatable blocks (12), each comprising a data dot pattern (14) of a plurality of dot arranged according to the data to be transmitted, a marker (18) for recognizing the block and a block header pattern (16) containing a block address data (16A) for indicating the address of the arranged block, the data dot pattern, the marker and the block header pattern being arranged with a predetermined positional relationship, the block header pattern containing information on restoration parameters (16B) necessary for restoring the encoded data and commonly used for the block header patterns of the blocks, the address data and the restoration parameters being unmodulated, and that the information on the mode of modulation contains information on the restoration parameters.

With this arrangement, the block header pattern contains information on restoration parameters necessary for restoring the encoded data and commonly used for the block header patterns of the blocks and the address data and the restoration parameters are unmodulated such that the information on the mode of modulation 16C is contained in the information on the restoration parameters.

Therefore, the operation control data is expressed by the way how redundant bits are added to the modulated data and hence a number of modulation modes can be used by making the information on the mode of modulation to be contained in the unmodulated restoration parameters.

Additionally, since the restoration parameters are not modulated, the process of demodulating the operation control data will comprise a number of steps that is less by one than the number of steps necessary for demodulating a data containing modulated restoration parameters. Still additionally, since the operation control data is contained in the redundant bits of the data, the data storage area of the code pattern image is not reduced by the operation control data.

(8) A code reading and recording apparatus according to (6) above, characterized in that the information on the mode of modulation is determined from the bit arrangement pattern for each of "1"s and "0"s contained in the data to be demodulated in order to retrieve the original data by deleting the redundant bits added to the original data.

With this embodiment, the information on the mode of modulation as described in (6) above is determined from the bit arrangement pattern for each of "1"s and "0"s contained in the data to be demodulated in order to retrieve the original data by deleting the redundant bits added to the original data.

Thus, since the information on the mode of modulation that contains the operation control data is expressed by the bit arrangement pattern of the data that contains modulated redundant bits, the data storage area of the code pattern image is not reduced by the operation control data.

(9) A code reading and recording apparatus according to (6), (7) or (8) above, characterized in that the code pattern image is realized by arranging a plurality of adjacently locatable blocks (12), each comprising a data dot pattern (14) of a plurality of dot arranged according to the data to be transmitted, a marker (18) for recognizing the block and a block header pattern (16) containing a block address data (16A) for indicating the address of the arranged block, the data dot pattern, the marker and the block header pattern being arranged with a predetermined positional relationship, and that the modulation is such that the modulated data does not contain a number of at least consecutive "1"s or "0"s exceeding the largest number of consecutive "1"s or "0"s of the markers or that the predetermined bit arrangements of the modulated data combining "1"s and "0"s do not contain any of the predetermined bit arrangements of the markers combining "1"s and "0"s.

Thus, the code pattern image is realized by arranging a plurality of adjacently locatable blocks, each of which comprises a data dot pattern of a plurality of dot arranged according to the data to be transmitted, a marker for recognizing the block and a block header pattern containing a block address data for indicating the address of the block arranged, and the data dot pattern, the marker and the block header pattern being arranged with a predetermined positional relationship. Additionally, the modulation is such that the modulated data does not contain a number of at least consecutive "1"s or "0"s exceeding the largest number of consecutive "1"s or "0"s of the markers or that the predetermined bit arrangements of the modulated data combining "1"s and "0"s do not contain any of the predetermined bit arrangements of the markers combining "1"s and "0"s.

Therefore, while the modulated data contains the operation control data, the risk of mistaking part of the proper data for markers is reduced by arranging consecutive "1"s and/or "0"s in a way different from the arrangement of consecutive "1"s and/or "0" for the markers. Thus, the modulated data for printing a code pattern image is made to take an additional role of containing the operation control data in the redundant bits of the modulated data so that an existing code format can be utilized without modification and without reducing the data storage area for the sake of the operation control data.

Additional advantages and modifications will readily occurs to those skilled in the art. Therefore, the invention in its broader aspects is not limited to the specific details and representative devices shown and described herein. Accordingly, various modifications may be made without departing from the spirit or scope of the general inventive concept as defined by the appended claims and their equivalents.

I claim:

1. A code reading and recording apparatus comprising:

a reading section for picking up and reading a code pattern image printed and/or recorded on a recording medium as data adapted to be picked up and read and containing at least one of an audio data, a video data and a digital code data;

a decoder for decoding the code pattern image read by said reading section and retrieving the original data;

an encoder for transforming the data retrieved by said decoder into an image data of a code pattern image; and a recording section for printing and/or recording the transformed image data on a predetermined recording medium as code pattern image adapted to be picked up and read, wherein the code pattern image contains an operation data for permitting or prohibiting the operation of the encoder, and the code reading and recording apparatus further comprises:

an operation control data extracting section for extracting the operation data from the code pattern image read by said reading section; and an operation control section for permitting or prohibiting the operation of said encoder according to the operation data extracted by said operation control data extracting section.

2. The code reading and recording apparatus according to claim 1, wherein said operation control data extracting section extracts physical structural characteristics from the code pattern image as operation control data.

3. The code reading and recording apparatus according to claim 2, wherein the code pattern image is realized by arranging a plurality of adjacently locatable blocks, each comprising a data dot pattern of a plurality of dot arranged according to the data to be transmitted, a marker for recognizing the block and a block header pattern containing a block address data for indicating the address of the arranged block, the data dot pattern, the marker and the block header pattern being arranged with a predetermined positional relationship, and physical structural characteristics of the code pattern image are used as information indicating how addresses are allocated to the blocks of the code pattern image.

4. The code reading and recording apparatus according to claim 3, wherein the information indicating how addresses are allocated is extracted at least by using as a unit of operation a deinterleaving process of restoring the original arrangement of the data for dispersing them according to a predetermined rule in the interleaving process performed at the time of printing and recording the code pattern image.

5. The code reading and recording apparatus according to claim 2, wherein the code pattern image is realized by arranging a plurality of adjacently locatable blocks, each comprising a data dot pattern of a plurality of dot arranged according to the data to be transmitted, a marker for recognizing the block and a block header pattern containing a block address data for indicating the address of the arranged block, the data dot pattern, the marker and the block header pattern being arranged with a predetermined positional relationship, the block header pattern containing information on restoration parameters necessary for restoring the encoded data and commonly used for the block header patterns of the blocks, and the differences among the data restoration parameters contained in each block header pattern are used as information indicating how addresses are allocated to the blocks of the code pattern image.

6. The code reading and recording apparatus according to claim 2, wherein the data is a data modulated to include predetermined redundant bits and the code pattern image is printed and/or recorded as an image adapted to be picked up and read and corresponding to the values of the bits of the modulated data, and the data on the physical structural characteristics of the code pattern image is a data on the mode of modulation relating to how predetermined redundant bits are added to the bits of the proper data.

7. The code reading and recording apparatus according to claim 6, wherein the code pattern image is realized by arranging a plurality of adjacently locatable blocks, each comprising a data dot pattern of a plurality of dot arranged according to the data to be transmitted, a marker for recognizing the block and a block header pattern containing a block address data for indicating the address of the arranged block, the data dot pattern, the marker and the block header pattern being arranged with a predetermined positional relationship, and the modulation is one of such that the modulated data does not contain a number of at least consecutive "1"s or "0"s exceeding the largest number of consecutive "1"s or "0"s of the markers and such that the predetermined bit arrangements of the modulated data combining "1"s and "0"s do not contain any of the predetermined bit arrangements of the markers combining "1"s and "0"s.

8. The code reading and recording apparatus according to claim 6, wherein the code pattern image is realized by arranging a plurality of adjacently locatable blocks, each comprising a data dot pattern of a plurality of dot arranged according to the data to be transmitted, a marker for recognizing the block and a block header pattern containing a block address data for indicating the address of the arranged block, the data dot pattern, the marker and the block header pattern being arranged with a predetermined positional relationship, the block header pattern containing information on restoration parameters necessary for restoring the encoded data and commonly used for the block header patterns of the blocks, the address data and the restoration parameters being unmodulated, and the information on the mode of modulation contains information on the restoration parameters.

9. The code reading and recording apparatus according to claim 8, wherein the code pattern image is realized by arranging a plurality of adjacently locatable blocks, each comprising a data dot pattern of a plurality of dot arranged according to the data to be transmitted, a marker for recognizing the block and a block header pattern containing a block address data for indicating the address of the arranged block, the data dot pattern, the marker and the block header pattern being arranged with a predetermined positional relationship, and the modulation is one of such that the modulated data does not contain a number of at least consecutive "1"s or "0"s exceeding the largest number of consecutive "1"s or "0"s of the markers and such that the predetermined bit arrangements of the modulated data combining "1"s and "0"s do not contain any of the predetermined bit arrangements of the markers combining "1"s and "0"s.

10. The code reading and recording apparatus according to claim 6, wherein the information on the mode of modulation is determined from the bit arrangement pattern for each of "1"s and "0"s contained in the data to be demodulated in order to retrieve the original data by deleting the redundant bits added to the original data.

11. The code reading and recording apparatus according to claim 10, wherein the code pattern image is realized by arranging a plurality of adjacently locatable blocks, each comprising a data dot pattern of a plurality of dot arranged according to the data to be transmitted, a marker for recognizing the block and a block header pattern containing a block address data for indicating the address of the arranged block, the data dot pattern, the marker and the block header pattern being arranged with a predetermined positional relationship, and the modulation is one of such that the modulated data does not contain a number of at least consecutive "1"s or "0"s exceeding the largest number of consecutive "1"s or "0"s of the markers and such that the predetermined bit arrangements of the modulated data combining "1"s and "0"s do not contain any of the predetermined bit arrangements of the markers combining "1"s and "0"s.

* * * * *